(12) United States Patent
Pandey et al.

(10) Patent No.: US 11,093,323 B2
(45) Date of Patent: Aug. 17, 2021

(54) PERFORMANT INLINE ECC ARCHITECTURE FOR DRAM CONTROLLER

(71) Applicant: NVIDIA CORPORATION, Santa Clara, CA (US)

(72) Inventors: Ashutosh Pandey, Bangalore North (IN); Jay Gupta, Bangalore (IN); Kaushal Agarwal, Bangalore (IN); Justin Bennett, San Jose, CA (US); Srinivas Santosh Kumar Madugula, Visakhapatnam (IN)

(73) Assignee: NVIDIA Corporation, Santa Clara, CA (US)

( * ) Notice: Subject to any disclaimer, the term of this patent is extended or adjusted under 35 U.S.C. 154(b) by 205 days.

(21) Appl. No.: 16/384,614

(22) Filed: Apr. 15, 2019

(65) Prior Publication Data
US 2020/0327010 A1 Oct. 15, 2020

(51) Int. Cl.
| | |
|---|---|
| *G06F 11/00* | (2006.01) |
| *G06F 11/10* | (2006.01) |
| *G06F 12/06* | (2006.01) |
| *G06F 13/40* | (2006.01) |
| *G06F 9/46* | (2006.01) |
| *G06F 9/48* | (2006.01) |
| *G06F 12/0882* | (2016.01) |

(52) U.S. Cl.
CPC .......... *G06F 11/1044* (2013.01); *G06F 9/466* (2013.01); *G06F 9/4881* (2013.01); *G06F 12/0607* (2013.01); *G06F 12/0882* (2013.01); *G06F 13/4013* (2013.01)

(58) Field of Classification Search
CPC .................................................. G06F 11/1044
See application file for complete search history.

(56) References Cited

U.S. PATENT DOCUMENTS

| | | | | |
|---|---|---|---|---|
| 6,772,289 | B1* | 8/2004 | Corrigan | G06F 11/1068 711/118 |
| 8,626,997 | B2* | 1/2014 | Qawami | G06F 12/0802 711/105 |
| 9,110,809 | B2* | 8/2015 | Holmqvist | G06F 12/0842 |
| 9,208,019 | B2* | 12/2015 | Mirichigni | G11C 29/52 |
| 9,354,967 | B1* | 5/2016 | Craddock | G06F 11/0793 |
| 9,367,392 | B2* | 6/2016 | Michael | G06F 11/1068 |

(Continued)

*Primary Examiner* — Elmira Mehrmanesh
(74) *Attorney, Agent, or Firm* — Artegis Law Group, LLP

(57) ABSTRACT

Techniques are disclosed for reducing the time required to read and write data to memory. Data reads and/or writes can be delayed when error correction code (ECC) bits, which are used to detect and/or correct data corruption, are written to memory. Writing ECC bits can take longer in some instances than writing data bits because an ECC write may involve a read/modify/write operation, as opposed to just simply writing the bits to memory. Some latencies associated with writing ECC bits can be hidden by interleaving ECC writes with data writes. However, if insufficient data writes are available for interleaving, hiding such latencies become difficult. Thus, various techniques are disclosed, for example, where ECC writes are deferred until a sufficient number of data writes become available for interleaving. By interleaving ECC writes, the disclosed techniques decrease the overall time required to read and write data to memory.

20 Claims, 8 Drawing Sheets

(56) References Cited

U.S. PATENT DOCUMENTS

| | | | | |
|---|---|---|---|---|
| 9,552,175 | B2* | 1/2017 | Takefman | G06F 12/1027 |
| 9,612,901 | B2* | 4/2017 | Ruggiero | G06F 11/1048 |
| 9,787,772 | B2* | 10/2017 | Holden | H04L 41/0893 |
| 10,282,250 | B1* | 5/2019 | Banerjee | G06F 3/0685 |
| 2008/0201626 | A1* | 8/2008 | Sturm | G11C 11/4096 |
| | | | | 714/763 |
| 2011/0246686 | A1* | 10/2011 | Cavanagh, Jr. | G06F 13/28 |
| | | | | 710/22 |
| 2012/0036400 | A1* | 2/2012 | Miller | G06F 11/10 |
| | | | | 714/54 |
| 2018/0336092 | A1* | 11/2018 | Kim | G06F 12/084 |
| 2020/0293396 | A1* | 9/2020 | Golov | G06F 11/1068 |

* cited by examiner

PERFORMANT INLINE ECC ARCHITECTURE FOR DRAM CONTROLLER

BACKGROUND

Field of the Various Embodiments

Various embodiments relate generally to computer memory controller technology and, more specifically, to techniques for reducing the time to read and write to memory.

Description of the Related Art

Some conventional memory controllers write system and application data and corresponding error correcting code (ECC) data to memory via a command/data bus. These memory controllers subsequently can read the system and application data and the corresponding ECC data from memory via the command/data bus and validate the system and application data using the corresponding ECC data.

Certain conventional memory controllers implement what is known as "inline ECC" operations. In such implementations, the memory controller writes the system and application data and the corresponding ECC data to the same memory page via the command/data bus. The memory controller subsequently reads the system and application data and the corresponding ECC data from that same memory page via the command/data bus. Memory controllers configured in this manner issue write transactions and corresponding ECC write transactions to memory during time intervals referred to herein as "write turns." These memory controllers subsequently issue read transactions and corresponding ECC read transactions to memory during time intervals referred to herein as "read turns." As a general matter, write turns and read turns alternate with one another.

ECC write transactions typically experience higher latencies for at least two reasons. First, a given ECC write transaction cannot occur immediately after a previous write transaction completes because a delay is needed to prepare the memory page for the additional write data associated with the ECC write transaction. This delay can be caused by an internal read-modify-write. Second, once a given ECC write transaction completes, an activate operation is usually needed to prepare the memory page for a subsequent read operation. These activate operations consume additional clock cycles.

The latencies associated with ECC write transactions can be masked when other write transactions from other banks are interleaved with those ECC write transactions on the command/data bus. However, towards the end of a write turn, most write transactions have already completed, leaving few, if any, write transactions that can be interleaved with ECC write transactions on the command/data bus. With fewer write transactions available for interleaving, the latencies associated with these ECC write turns oftentimes cannot be masked, which can degrade overall performance in various ways.

First, the write turn has to be prolonged while the remaining ECC write transactions complete. Prolonging a write turn delays the subsequent read turn, thereby reducing the speed at which the memory can be accessed. The latencies typically associated with ECC write transactions discussed above exacerbate these types of delays. In turn, then latencies of critical requests such as central processor unit (CPU) reads and/or memory management unit (MMU) walks can increase, thereby degrading overall system performance. Second, the command/data bus is underutilized while the remaining ECC write transactions complete, resulting in "bubbles" on the command/data bus that can reduce overall bus performance. Both of these issues can further degrade system performance when multiple ECC writes are pending on the same bank.

As the foregoing illustrates, what is needed in the art are more effective ways for scheduling ECC write transactions to memory.

SUMMARY

Various embodiments include a computer-implemented method, including determining that an insufficient number of pending write transactions are available to mask one or more latencies associated with a first error-correcting code (ECC) write transaction during a first period of time when write transactions are scheduled for execution, in response to determining that an insufficient number of pending write transactions are available, preventing the first ECC write transaction from being scheduled for execution during the first period of time, determining that a sufficient number of pending write transactions are available to mask the one or more latencies during a second period of time when write transactions are scheduled for execution, and in response to determining that a sufficient number of pending write transactions are available, scheduling the first ECC write transaction for execution during the second period of time.

At least one technological advantage of the disclosed techniques relative to the prior art is that latencies associated with end-of-turn ECC write transactions can continue to be masked by deferring those ECC write transactions to a subsequent turn. As a result, fewer of the read turns following write turns have to be delayed, and more ECC write transaction latencies can be masked, which increases memory access speed and overall performance.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
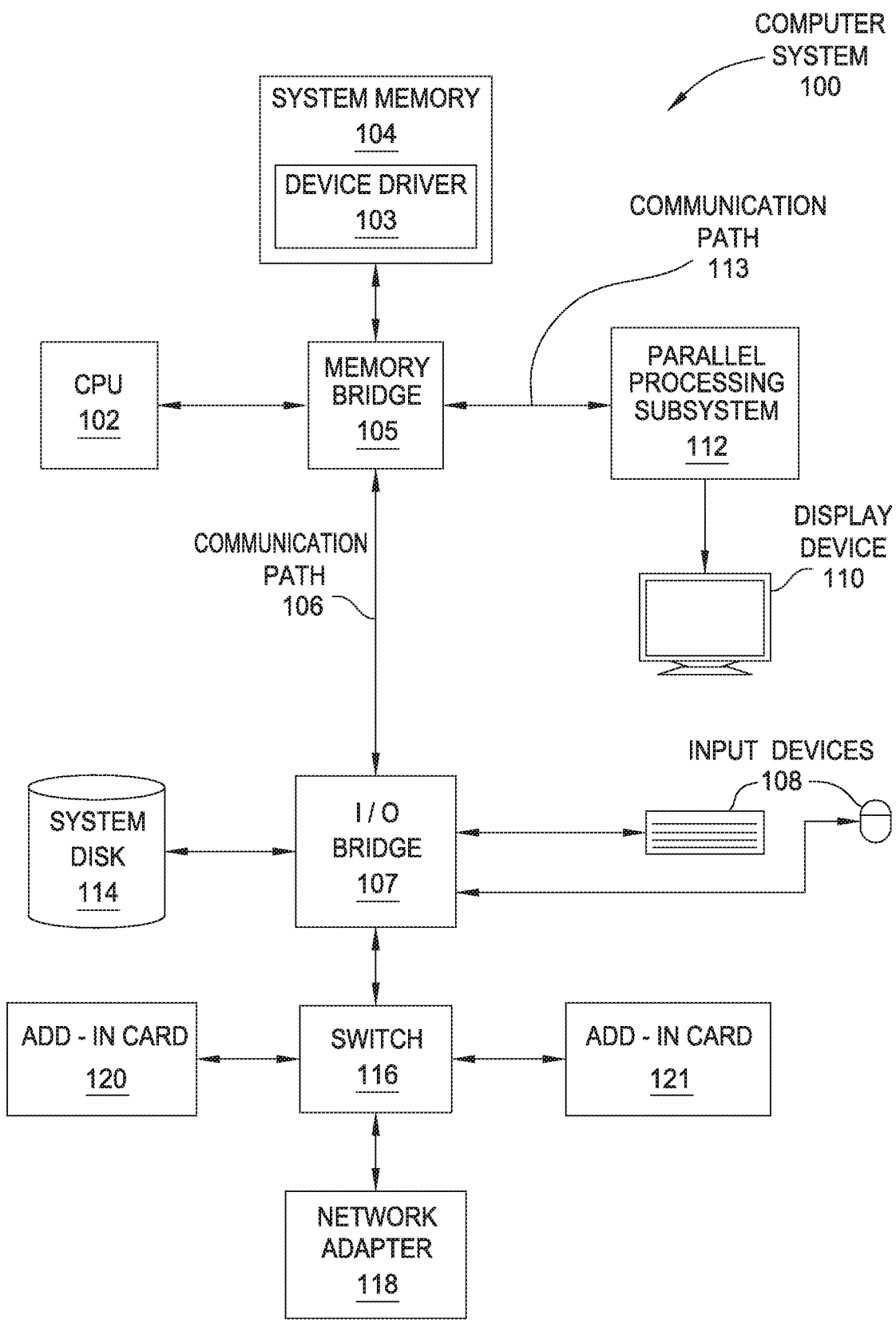
FIG. 1 illustrates a system configured to implement one or more aspects of the present embodiments.

In the following description, numerous specific details are set forth to provide a more thorough understanding of the various embodiments. However, it will be apparent to one skilled in the art that the inventive concepts may be practiced without one or more of these specific details.

As noted above, a memory controller configured to implement "inline ECC" issues a write transaction and a corresponding ECC write transaction to the same page of memory during a write turn. The ECC write transaction can be a "masked" write that triggers an internal read-modify-write. Subsequently, the memory controller can issue a read transaction and a corresponding ECC read transaction to the same page of memory during a read turn. The memory controller issues these various transactions across a command/data bus.

ECC write transactions incur various latencies that can be masked when other write transactions are interleaved with those ECC write transactions on the command/data bus. However, towards the end of a write turn, insufficient write transactions remain to be interleaved with ECC write transactions, and the latencies associated with those ECC write transactions cannot be masked. Consequently, the write turn may have to be prolonged while the remaining ECC write transactions complete. During this time, the command/data bus is underutilized, leading to a condition known in the art as a "bubble."

To address these issues, various embodiments include a transaction arbiter that schedules memory transactions across a command/data bus. During a write turn, the transaction arbiter determines whether sufficient write transactions are available to interleave with ECC write transactions in order to mask latencies associated with those ECC write transactions. If insufficient write transactions are available, the transaction arbiter activates a cache to store the remaining ECC write transaction, thereby allowing a subsequent read turn to begin. During the subsequent read turn, if the transaction arbiter schedules an ECC read transaction for ECC data corresponding to a cached ECC write transaction, the ECC read transaction is serviced from the cache. During a subsequent write turn, the transaction arbiter prioritizes scheduling the cached ECC write transactions, thereby allowing those ECC write transactions to be interleaved with other write transactions on the command/data bus.

At least one technological advantage of the disclosed techniques relative to the prior art is that latencies associated with end-of-turn ECC write transactions can continue to be masked by deferring those ECC write transactions to a subsequent turn. As a result, fewer of the read turns following write turns have to be delayed, and more ECC write transaction latencies can be masked, which increases memory access speed and overall performance. Another technological advantage of the disclosed techniques is that the deferred ECC write transactions can be interleaved with other write transactions to increase command/data bus utilization. The disclosed techniques can therefore be implemented to reduce the occurrence of bubbles on the command/data bus and improve command/data bus performance. These technological advantages represent one or more technological advancements relative to prior art approaches.

System Overview

FIG. 1 is a block diagram illustrating a computer system 100 configured to implement one or more aspects of the present embodiments. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC), as also described in greater detail below in conjunction with FIG. 3B.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
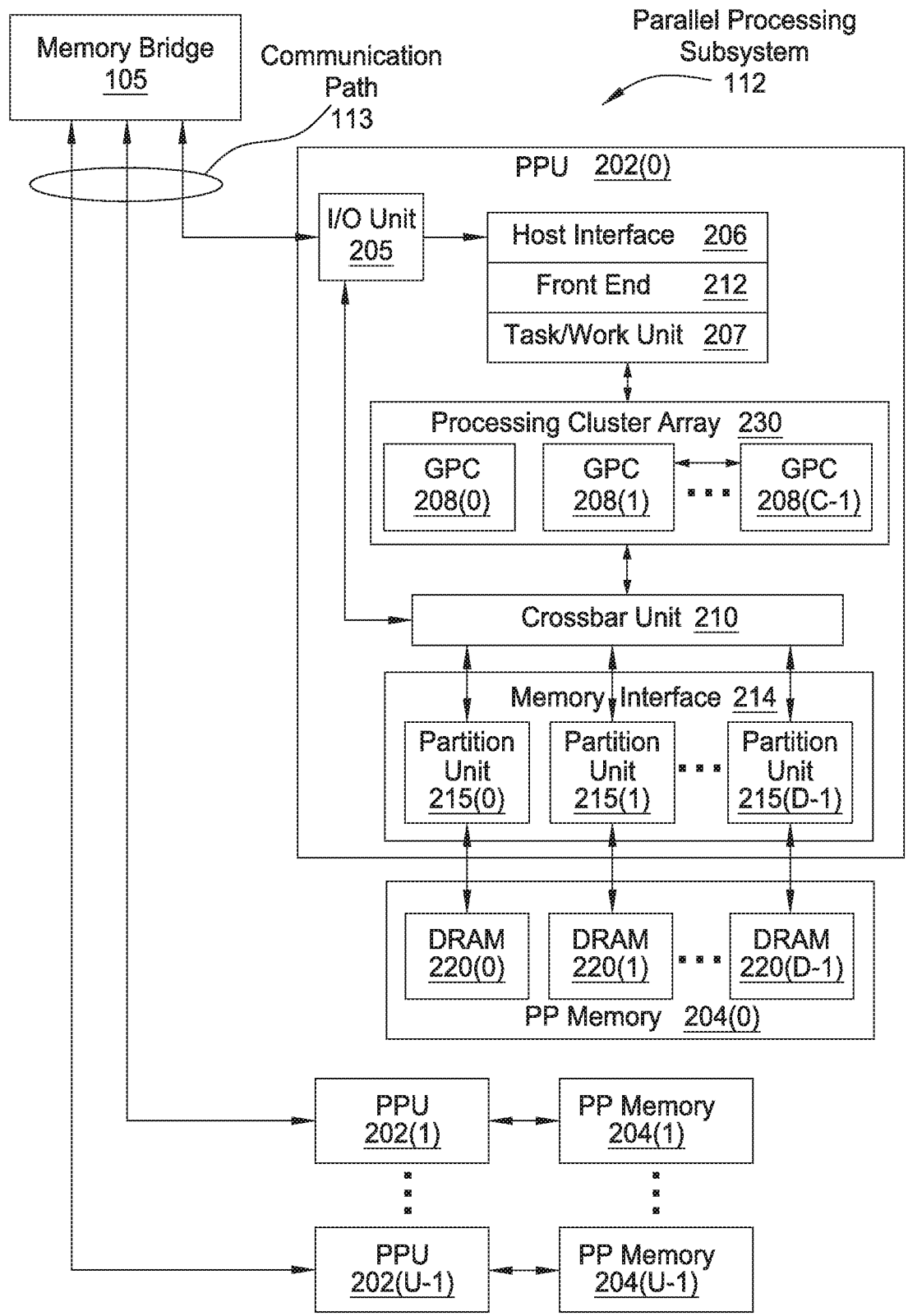
FIG. 2 is a more detailed illustration of the parallel processing subsystem of FIG. 1, according to various embodiments.

FIG. 2 illustrates a parallel processing subsystem 112, according to various embodiments. As shown, parallel processing subsystem 112 includes one or more parallel processing units (PPUs) 202, each of which is coupled to a local parallel processing (PP) memory 204. In general, a parallel processing subsystem includes a number U of PPUs, where U □ 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
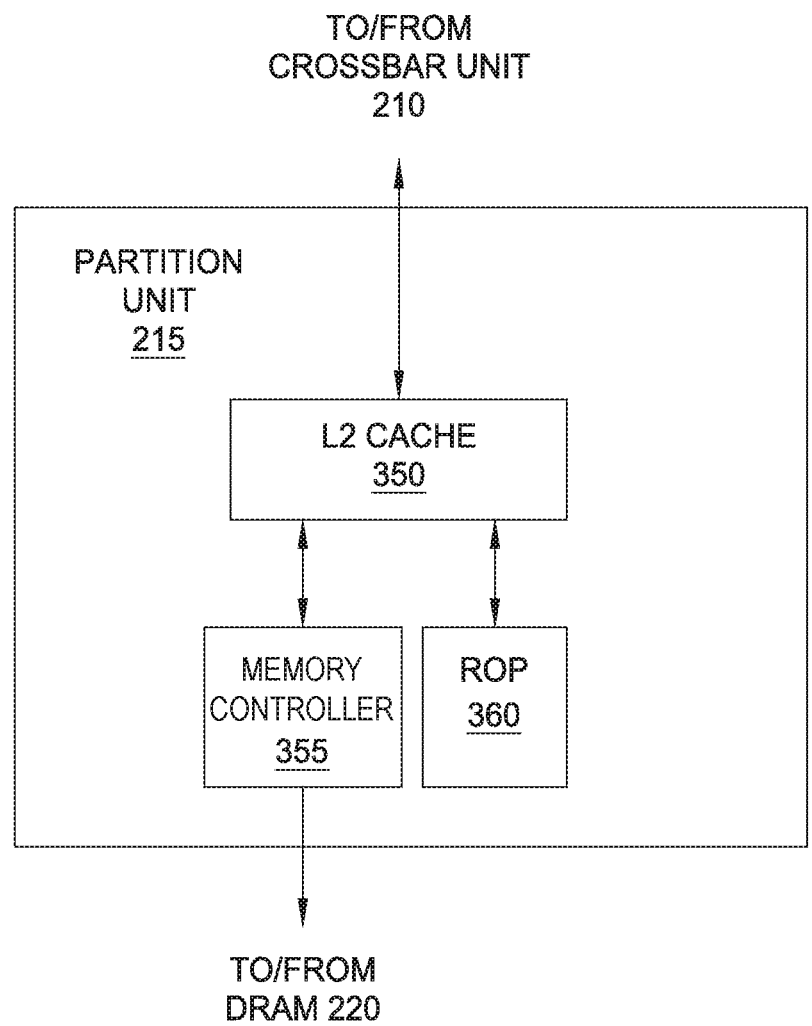
FIG. 3A is a more detailed illustration of the partition unit of FIG. 2, according to various embodiments.

FIG. 3A is a block diagram of a partition unit 215 within one of the PPUs 202 of FIG. 2, according to various embodiments. As shown, partition unit 215 includes a L2 cache 350, a memory controller 355, and a raster operations unit (ROP) 360. L2 cache 350 is a read/write cache that is configured to perform load and store operations received from crossbar unit 210 and ROP 360. Read misses and urgent writeback requests are output by L2 cache 350 to memory controller 355 for processing. Dirty updates are also sent to memory controller 355 for opportunistic processing. Memory controller 355 interfaces directly with DRAM 220, outputting read and write requests and receiving data read from DRAM 220. Memory controller 355 can be implemented in SoC architectures as well, as described in greater detail below in conjunction with FIG. 3B.

In graphics applications, ROP 360 is a processing unit that performs raster operations, such as stencil, z test, blending, and the like, and outputs pixel data as processed graphics data for storage in graphics memory. In some embodiments, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
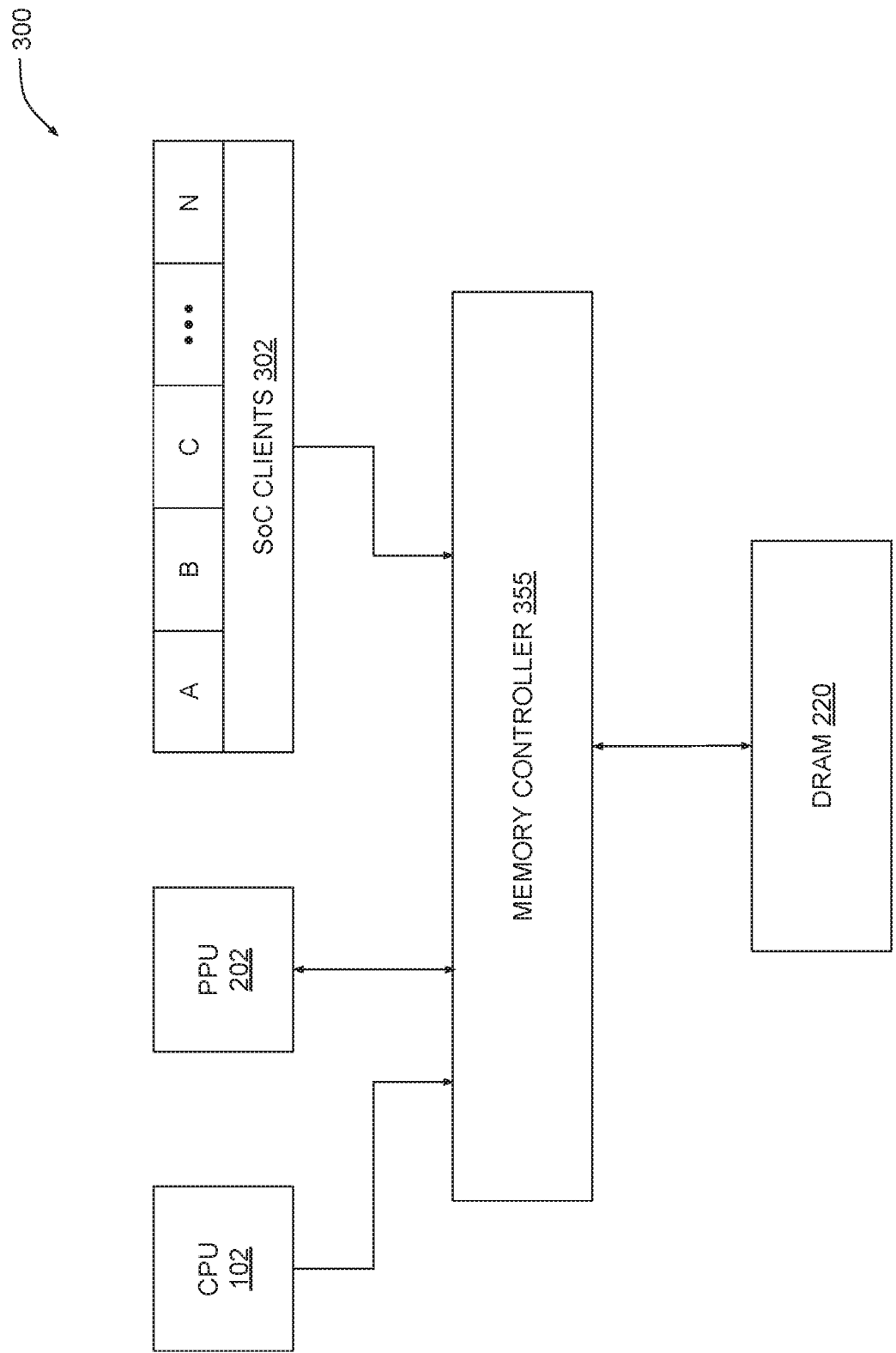
FIG. 3B illustrates an alternative system that can implement the memory controller of FIG. 3A, according to various embodiments.

FIG. 3B illustrates an alternative system that can implement the memory controller of FIG. 3A, according to various embodiments. As shown, a system 300 includes CPU 102 of FIG. 1, PPU 202 of FIG. 2, and system-on-chip (SoC) clients 302. SoC clients 302 can include encoders, decoders, displays, cameras, and other devices. CPU 102, PPU 202, and SoC clients 302 are coupled to memory controller 355 configured to transmit various types of memory transactions to memory controller 355. In response, memory controller 355 accesses data stored in DRAM 220. For example, CPU 102 could transmit one or more write transactions to memory controller 355. In response, memory controller 355 could write data to DRAM 220. Similarly, CPU 102 could transmit one or more read transactions to memory controller 355. In response, memory controller 355 could read data from DRAM 220.

Referring generally to FIGS. 3A-3B, memory controller 355 can be implemented in either of the configurations shown in these Figures to provide access to DRAM 220. Memory controller 355 performs various operations to coordinate the execution of memory transactions to improve memory access performance, as described in greater detail below in conjunction with FIGS. 4-7.

Memory Controller Configured for Improved Memory Access

Figure 4:
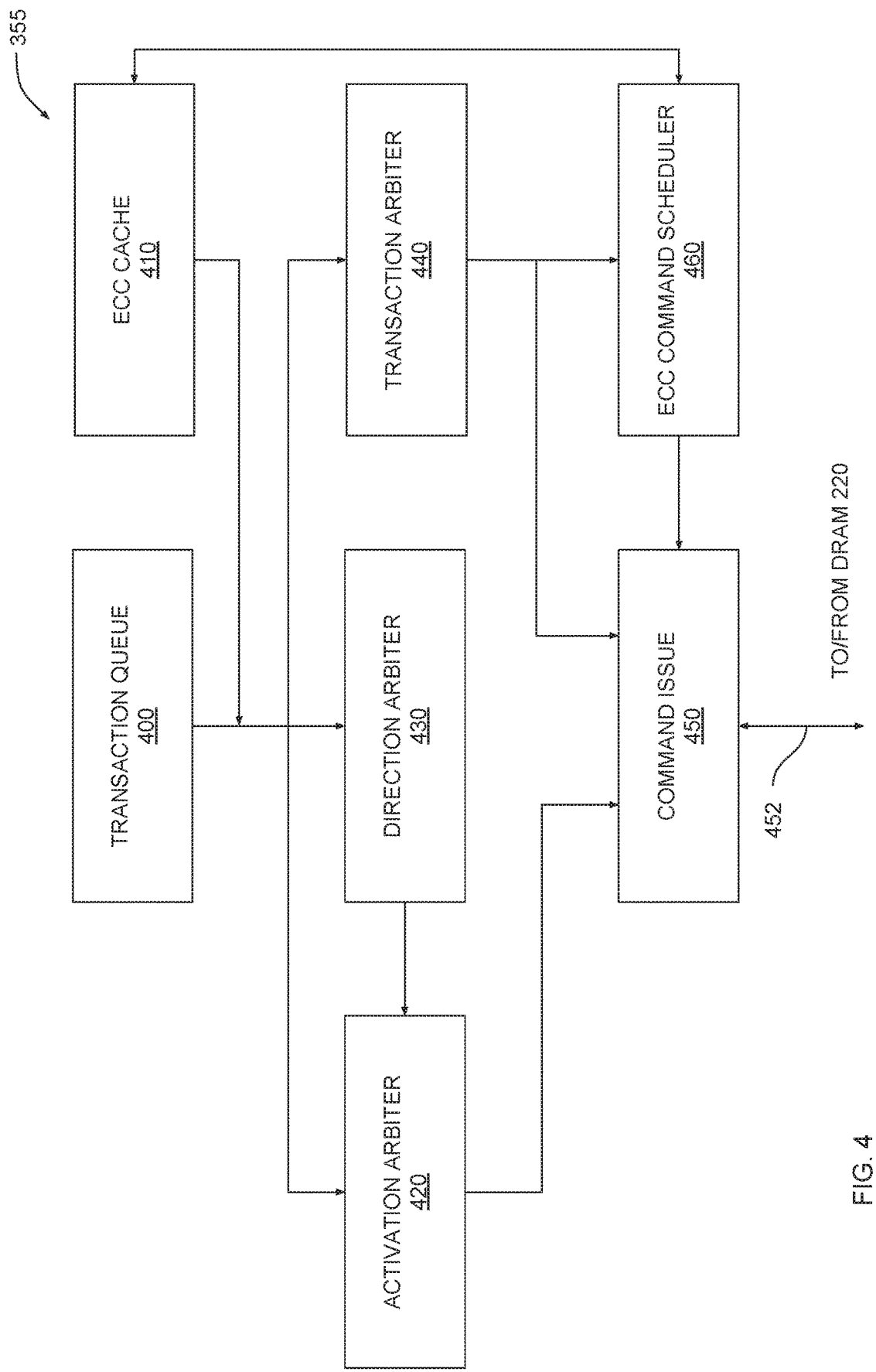
FIG. 4 is a more detailed illustration of the memory controller of FIGS. 3A and 3B, according to various embodiments.

FIG. 4 is a more detailed illustration of the memory controller of FIGS. 3A-3B, according to various embodiments. As shown, memory controller 355 includes a transaction queue 400, an ECC cache 410, an activation arbiter 420, a direction arbiter 430, a transaction arbiter 440, a command issue 450, and an ECC command scheduler 460. Transaction queue 400 is coupled to activation arbiter 420, direction arbiter 430, and transaction arbiter 440. Activation arbiter 420 is coupled to command issue 450. Direction arbiter 430 is coupled to activation arbiter 420. Transaction arbiter 440 is coupled to command issue 450 and ECC command scheduler 460. Command issue 450 is coupled to DRAM 220 via command/data bus 452. ECC command scheduler 460 is coupled to ECC cache 410.

Transaction queue 400 is configured to queue write transactions and read transactions. Write transactions relate to normal system data to be written to DRAM 220 and read transactions relate to normal system data to be read from DRAM 220.

Transaction arbiter 440 obtains write transactions from transaction queue 400 and causes command issue 450 to issue those write transactions to DRAM 220 during write turns. ECC command scheduler 460 generates ECC write transactions corresponding to those write transactions during write turns. The ECC write transactions specify ECC data associated with the system data that is to be written to DRAM 220. As referred to herein, a "write turn" is an interval when write transactions and ECC write transactions are scheduled for execution.

During a given write turn, transaction arbiter 440 schedules a given write transaction to be executed and ECC command scheduler 460 schedules a corresponding ECC write transaction to be executed. In response, DRAM 220 stores the write data associated with the given write transaction to a given memory page and stores the ECC data associated with the corresponding ECC write transaction to that same memory page. This approach may be known in the art as "inline ECC." In one embodiment, a fraction of each memory page may be allocated for ECC data and the remaining portion of each memory page may be allocated for normal system data.

Transaction arbiter 440 obtains read transactions from transaction queue 400 and causes command issue 450 to issue those read transactions to DRAM 220 during read turns. ECC command scheduler 460 generates ECC read transactions corresponding to those read transactions during read turns. The ECC read transactions specify ECC data associated with the system data that is to be read from DRAM 220. As referred to herein, a "read turn" is an interval when read transactions and ECC read transactions are scheduled for execution.

During a given read turn, ECC command scheduler 460 schedules a given ECC read transaction to read ECC data from a relevant memory page of DRAM 220 and transaction arbiter 440 then schedules a corresponding read transaction to read data from that same memory page DRAM 220. The ECC data can be used to validate the read data, as is known in the art.

Direction arbiter 430 analyzes transaction queue 400 and determines whether a write turn or a read turn should occur. Direction arbiter 430 implements a turn policy based on transactions stored in transaction queue 400 to alternate between write turns and read turns. The turn policy indicates specific conditions under which a given turn ends and a subsequent turn begins. Activation arbiter 420 transmits activation commands to DRAM 220 to prepare for a given write turn or a given read turn.

ECC write transactions are usually partial write transactions and therefore can incur a significant latency. Transaction arbiter 440 and ECC command scheduler 460 can sometimes mask this latency during write turns by interleaving write transactions and ECC write transactions. Transaction arbiter 440 and ECC command scheduler 460 can mask latency in this manner when sufficient write transactions are available and sufficient banks of command/data bus 452 are open to service those write transactions. However, when the write turn draws to a close, insufficient write transactions may be available to interleave with any remaining ECC write transactions and insufficient banks of command/data bus 452 may be open. Consequently, the write turn has to be prolonged until the remaining ECC write transactions complete. During this time, command/data bus 452 is underutilized. These issues are described in greater detail below in conjunction with FIG. 5.

To address the above issues, transaction arbiter 440 analyzes transaction queue 400 during write turns and determines when insufficient write transactions are available to mask latency associated with any remaining ECC write transactions. Transaction arbiter 440 then activates ECC cache 410 and causes ECC command scheduler 460 to cache the remaining ECC write transactions. Transaction arbiter 440 can then initiate the read turn without waiting for these remaining ECC write transactions to complete. During the read turn, any ECC read transactions that target the same memory space associated with cached ECC write transactions are serviced from ECC cache 410. During a subsequent write turn, cached ECC write transactions are prioritized to occur near the start of the write turn and can therefore be interleaved with write transactions, thereby masking latency associated with these ECC write transactions. This approach is described in greater detail below in conjunction with FIG. 6.

Exemplary Bus Activity Plots

Figure 5:
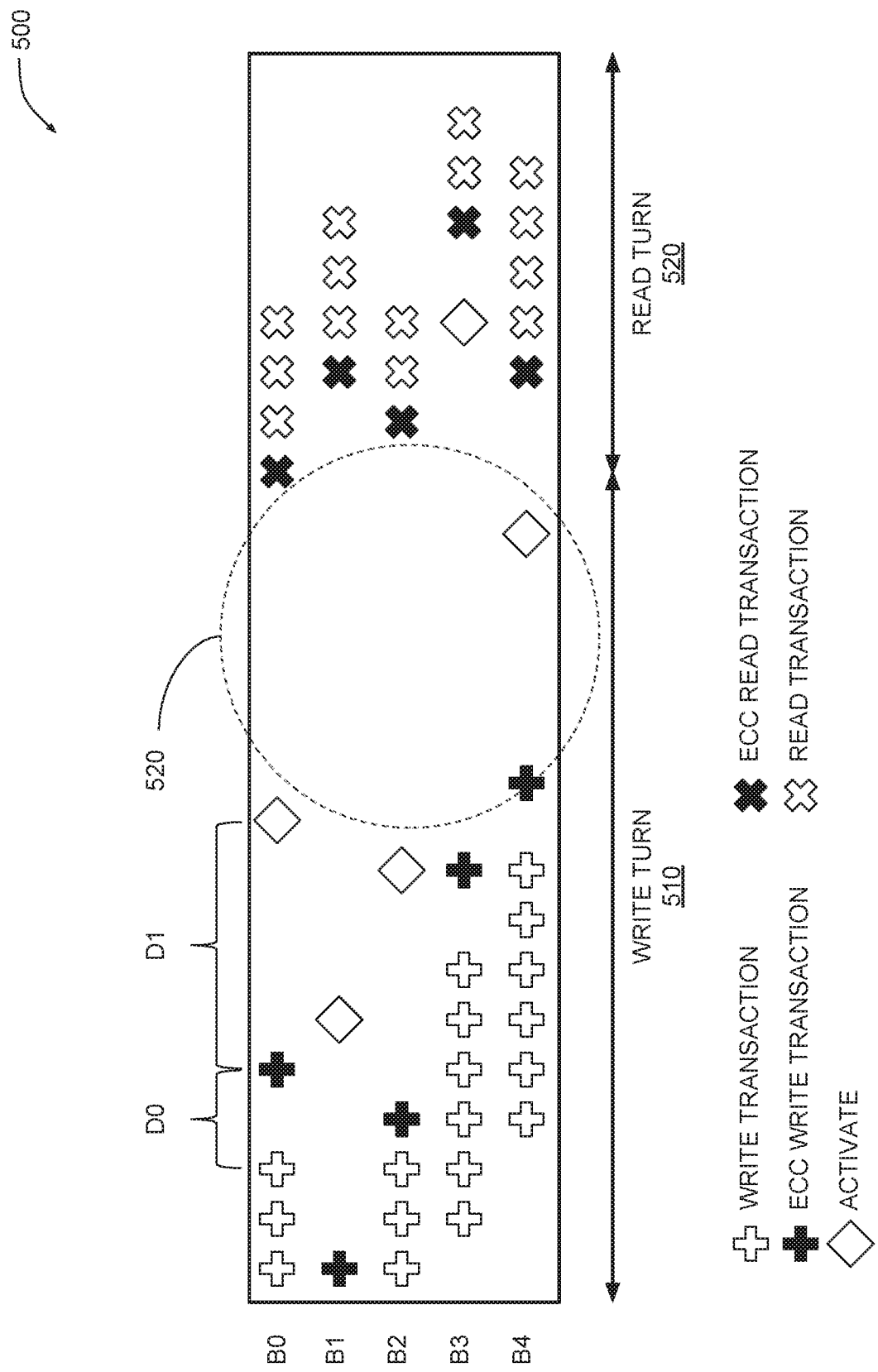
FIG. 5 is a bus activity plot illustrating how ECC write transactions can reduce performance, according to various embodiments.

FIG. 5 is a bus activity plot illustrating how ECC write transactions can reduce performance, according to various embodiments. As shown, bus activity plot 500 indicates various operations that occur on banks B0 through B4 of command/data bus 452 during a write turn 510 and a subsequent read turn 520. These operations include write transactions, ECC write transactions, activations, ECC read transactions, and read transactions.

As noted above, ECC write transactions can incur a significant latency. This latency occurs for two reasons. First, a given ECC write transaction cannot occur immediately after a previous write transaction completes. The given ECC write transaction can only begin after a minimum delay that is shown in bus activity plot 500 as D0. Second, an activation that follows a given ECC write transaction cannot occur immediately after the ECC write transaction completes. The activation can only begin after a minimum delay that is shown in bus activity plot 500 as D1.

The delays associated with a given ECC write transaction can be masked when many banks are open and write transactions can be interleaved with the given ECC write transaction. For example, delays D0 and D1 associated with bank B0 are masked by the write transactions occurring on banks B3 and B4.

However, towards the end of write turn 510, many write transactions are already complete and corresponding banks may be closed. Consequently, write transactions may not be available to mask the latency associated with any remaining ECC write transactions. For example, the ECC write transactions occurring on banks B3 and B4 cannot be masked. In this situation, a bubble 520 occurs because the ECC write transactions occurring on banks B3 and B4 cause write turn 510 to be prolonged and during this time command/data bus 452 is underutilized. Bubbles generally limit the performance of command/data bus 452. Transaction arbiter 440 and ECC command scheduler 460 mitigate bubbles caused by end-of-turn ECC write transactions via the approach described below in conjunction with FIG. 6.

Figure 6:
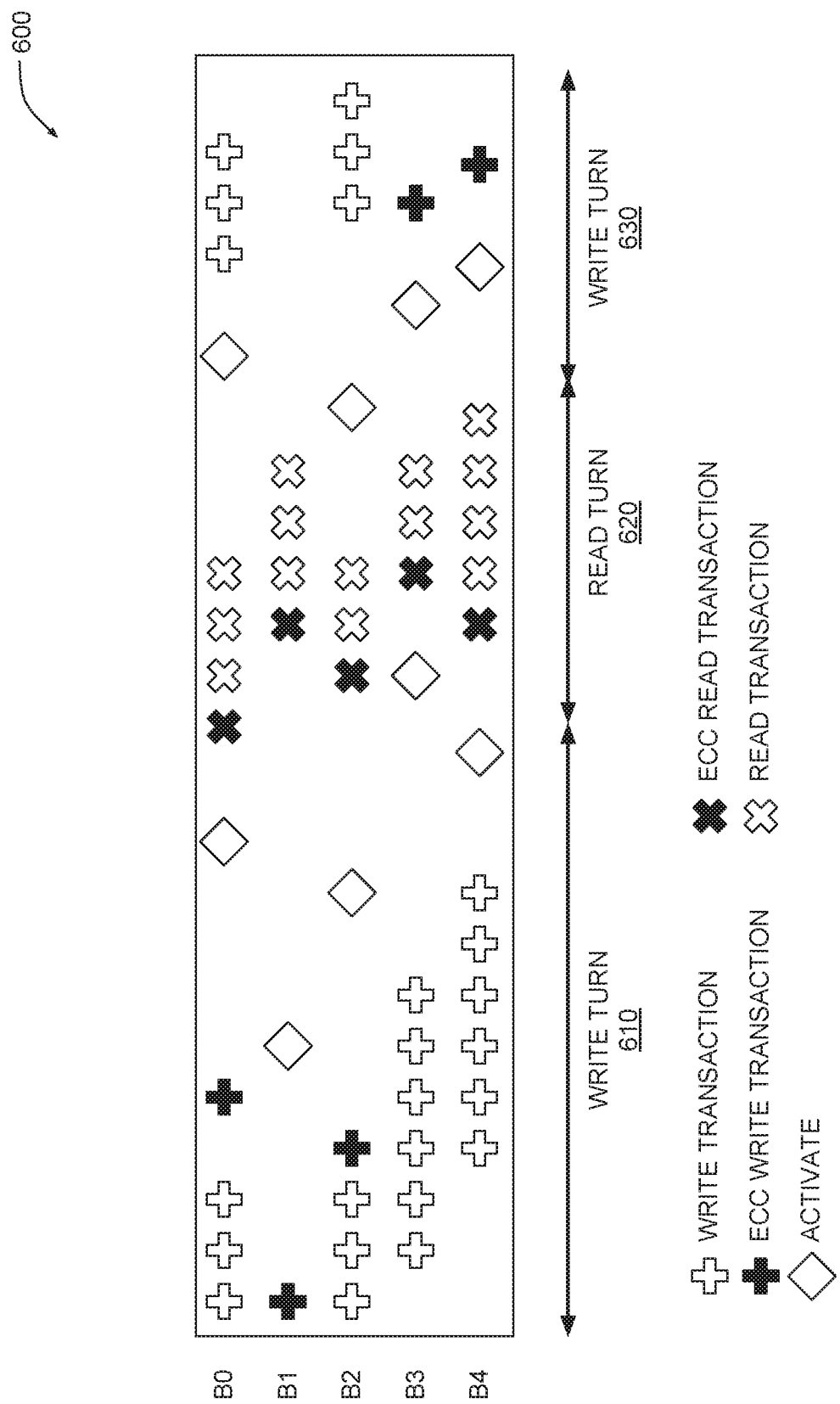
FIG. 6 is a bus activity plot illustrating how caching ECC write transactions improves performance, according to various embodiments.

FIG. 6 is a bus activity plot illustrating how caching ECC write transactions can improve performance, according to various embodiments. As shown, bus activity plot 600 indicates various operations that occur on banks B0 through B4 of command/data bus 452 during a write turn 610, a subsequent read turn 620, and a subsequent write turn 630.

During write turn 610, transaction arbiter 440 determines that insufficient write transactions are available to mask latencies associated with the ECC write transactions on banks B3 and B4 (previously shown in write turn 510 of FIG. 5). In response, transaction arbiter 440 defers these ECC write transactions to occur during write turn 630, as is shown. In doing so, transaction arbiter 440 activates ECC cache 410 and ECC command scheduler 460 transmits ECC write transactions to ECC cache 410 instead of issuing those transactions for execution.

With this approach, write turn 610 need not be prolonged to accommodate end-of-turn ECC write transactions, and read turn 620 can therefore begin earlier than read turn 520 of FIG. 5. Any ECC read transactions targeting memory spaces associated with cached ECC write transactions are serviced from ECC cache 410. Once read turn 620 completes, transaction arbiter 440 prioritizes the cached ECC write transactions during write turn 630 and interleaves these transactions on banks B3 and B4 with other write transactions on banks B0 and B1. As such, the latencies associated with these ECC write transactions can be effectively masked and bubbles on command/data bus 452 can be reduced or avoided.

In one embodiment, the number of write transactions needed to mask latency associated with a given ECC write transaction is proportional to the number of clock cycles needed to perform the ECC write transaction. For example, when a given ECC write transaction completes in N clock cycles, then N write transactions would be needed to mask latency associated with the given ECC write transaction. In one embodiment, transaction arbiter 440 may interleave ECC write transactions with write transactions from different bank groups.

Deferring ECC Write Transactions for Improved Performance

Figure 7:
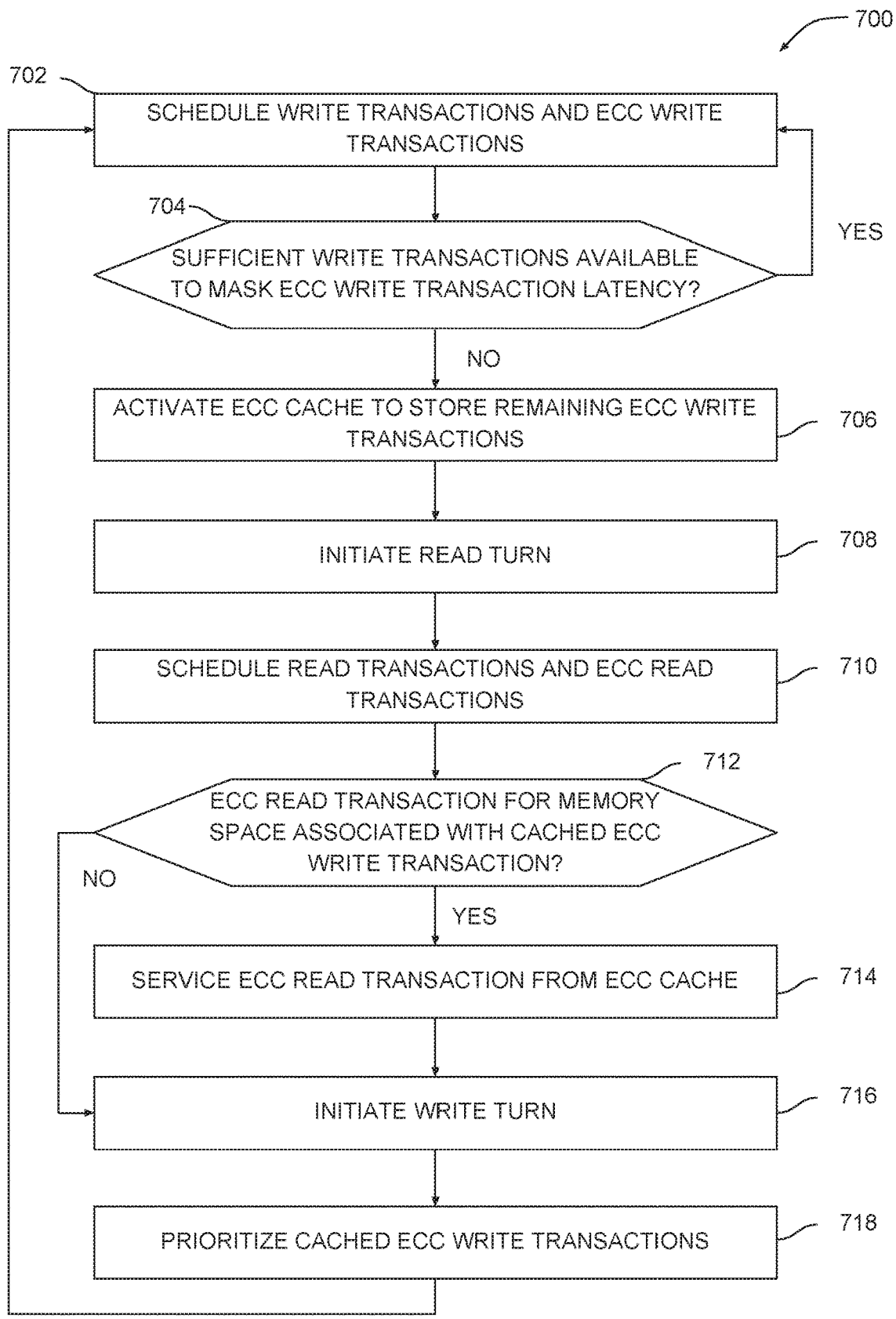
FIG. 7 is a flow diagram of method steps for caching ECC write transactions to improve performance, according to various embodiments.

FIG. 7 is a flow diagram of method steps for caching ECC write transactions to improve performance, according to various embodiments. Although the method steps are described in conjunction with the systems of FIGS. 1-6, persons skilled in the art will understand that any system configured to perform the method steps in any order falls within the scope of the various embodiments.

As shown, a method 700 begins at step 702, where transaction arbiter 440 of FIG. 4 schedules write transactions and ECC command scheduler 460 generates and schedules ECC write transactions. Transaction arbiter 440 issues write transactions and ECC command scheduler 460 schedules ECC write transactions during a write turn. During the write turn, transaction arbiter 440 retrieves write transactions from transaction cache 400 and, in some cases, previously cached ECC write transactions.

At step 704, transaction arbiter 440 determines whether sufficient write transactions are available to mask ECC write transaction latency. ECC write transaction latency occurs because an ECC write transaction cannot be performed immediately after a previous write transaction and a subsequent activation operation cannot be performed immediately after the ECC write transaction. These latencies usually cannot be masked towards the end of the write turn.

If at step 704 transaction arbiter 440 determines that sufficient write transactions are available, then the method 700 returns to step 702 and transaction arbiter 440 continues scheduling write transactions and ECC command scheduler 460 continues scheduling ECC write transactions. Transaction arbiter 440 also prioritizes the scheduling of any cached ECC write transactions. Alternatively, if at step 704 transaction arbiter 440 determines that sufficient write transactions are not available, then the method 700 proceeds to step 706.

At step 706, transaction arbiter 440 activates ECC cache 410 to store any remaining ECC write transactions until a subsequent write turn. ECC cache 410 is sized to accommodate the number of ECC write transactions typically remaining at the end of the write turn. ECC cache 410 is configured to service ECC read requests that target the same memory spaces as any cached ECC write transactions.

At step 708, direction arbiter 430 initiates a read turn. Direction arbiter 430 implements a turn policy based on the number and/or priority of transactions stored in transaction queue 400, among other things. In one embodiment, the turn policy may indicate that a transition from a write turn to a read turn should occur when a threshold number of read transactions reside in transaction queue 400.

At step 710, in response to direction arbiter 430, transaction arbiter 440 initiates a read turn and schedules read transactions while ECC command scheduler 460 schedules corresponding ECC read transactions. In so doing, transaction arbiter 440 issues read transactions and ECC command scheduler 460 issues ECC read transactions on command/data bus 452. ECC read transactions that target ECC data are generally scheduled before read transactions that target corresponding read data. The read data can then be validated and/or corrected, as needed, based on the ECC data.

At step 712, transaction arbiter 440 determines whether any ECC read transactions target a memory space associated with a cached ECC write transaction. If transaction arbiter 440 identifies an ECC read transaction targeting a memory space associated with a cached ECC write transaction, then the method proceeds to step 714. At step 714, transaction arbiter 440 causes ECC cache 410 to service the ECC read transaction based on the cached ECC write transaction. In one embodiment, the cached ECC write transaction may include ECC data that needs to be provided in response to the ECC read transaction. If at step 712 transaction arbiter 440 does not identify any ECC read transactions targeting a memory space associated with a cached ECC write transaction, then the method skips step 714 and proceeds to step 716. In situations were ECC data is not cached, then ECC data can also be read from DRAM 220, potentially delaying initiation of the subsequent write turn.

At step 716, direction arbiter 430 initiates a write turn based on the turn policy discussed above in conjunction with step 708. In one embodiment, the turn policy may indicate that a transition from a read turn to a write turn should occur when a threshold number of write transactions reside in transaction queue 400. After the read turn concludes, transaction arbiter 440 may stop caching ECC write transactions.

At step 718, transaction arbiter 440 prioritizes cached ECC write transactions when issuing write transactions during the write turn. The cached ECC write transactions can then be interleaved with other write transactions on different banks of command/data bus 452, thereby masking latency associated with these ECC write transactions. Transaction arbiter 440 can deactivate ECC cache 410 once all cached ECC write transactions have been scheduled and then continuously determine whether or not sufficient write transactions are available to mask latencies associated with ECC write transactions. In one embodiment, the number of write transactions needed to mask latency associated with a given ECC write transaction is proportional to the number of clock cycles needed to perform the ECC write transaction. In another embodiment, transaction arbiter 440 may interleave ECC write transactions with write transactions from different bank groups.

In sum, a transaction arbiter schedules memory transactions across a command/data bus. During a write turn, the transaction arbiter determines whether sufficient write transactions are available to interleave with ECC write transactions in order to mask latencies associated with those ECC write transactions. If insufficient write transactions are available, the transaction arbiter activates a cache to store the remaining ECC write transaction, thereby allowing a subsequent read turn to begin. During the subsequent read turn, if the transaction arbiter schedules an ECC read transaction for ECC data corresponding to a cached ECC write transaction, the ECC read transaction is serviced from the cache. During a subsequent write turn, the transaction arbiter prioritizes scheduling the cached ECC write transactions, thereby allowing those ECC write transactions to be interleaved with other write transactions on the command/data bus.

One implementation of the disclosed memory controller includes a transaction arbiter that performs a series of steps. In a first step, the transaction arbiter determines that insufficient write transactions are available to mask latencies associated with an ECC write transaction. The transaction arbiter performs this step by determining that less than N write transactions are queued, where the ECC write transaction takes N clock cycles to complete. In a second step, the transaction arbiter prevents the ECC write transaction from being scheduled to execute. The transaction arbiter performs this step by caching the ECC write transaction instead of scheduling the ECC write transaction to execute during the first write turn. In a third step, the transaction arbiter determines that sufficient write transactions are available during a second write turn to mask latencies associated with the ECC write transaction. The transaction arbiter performs this step by determining that at least N write transactions are queued during the second write turn. In a fourth step, the transaction arbiter schedules the ECC write transaction to execute during the second write turn. By performing these four steps and the corresponding sub-steps, the transaction arbiter reduces the occurrence of bus bubbles caused by ECC write transactions scheduled to execute at the end of write turns, thereby allowing memory subsystems to operate more effectively.

At least one technological advantage of the disclosed techniques relative to the prior art is that latencies associated with end-of-turn ECC write transactions can continue to be masked by deferring those ECC write transactions to a subsequent turn. As a result, fewer of the read turns following write turns have to be delayed, and more ECC write transaction latencies can be masked, which increases memory access speed and overall performance. Another technological advantage of the disclosed techniques is that the deferred ECC write transactions can be interleaved with other write transactions to increase command/data bus utilization. The disclosed techniques can therefore be implemented to reduce the occurrence of bubbles on the command/data bus and improve command/data bus performance. These technological advantages represent one or more technological advancements relative to prior art approaches.

1. Some embodiments include a computer-implemented method, comprising determining that an insufficient number of pending write transactions are available to mask one or more latencies associated with a first error-correcting code (ECC) write transaction during a first period of time when write transactions are scheduled for execution, in response to determining that an insufficient number of pending write transactions are available, preventing the first ECC write transaction from being scheduled for execution during the first period of time, determining that a sufficient number of pending write transactions are available to mask the one or more latencies during a second period of time when write transactions are scheduled for execution, and in response to determining that a sufficient number of pending write transactions are available, scheduling the first ECC write transaction for execution during the second period of time.

2. The computer-implemented method of clause 1, wherein preventing the first ECC write transaction from being scheduled to execute comprises caching the first ECC write transaction during the first period of time and during a subsequent period of time when read transactions are scheduled to execute.

3. The computer-implemented method of any of clauses 1-2, further comprising determining that a first read transaction targets a memory page associated with the first ECC write transaction, and servicing the first read transaction using a cached version of the first ECC write transaction.

4. The computer-implemented method of any of clauses 1-3, further comprising scheduling one or more write transactions to execute using a first bank associated with a command/data bus during the second period of time, wherein scheduling the first ECC write transaction for execution comprises scheduling the first ECC write transaction to execute using a second bank associated with the command/data bus during the second period of time.

5. The computer-implemented method of any of clauses 1-4, wherein the first ECC write transaction executes during N clock cycles that occur during the second period of time, and the one or more write transactions include at least N write transaction(s), wherein N comprises a positive integer value.

6. The computer-implemented method of any of clauses 1-5, wherein the first ECC write transaction is associated with write data that is written to a first memory page during the first period of time.

7. The computer-implemented method of any of clauses 1-6, wherein the first ECC write transaction is executed during the second period of time to write ECC data associated with the write data to the first memory page.

8. The computer-implemented method of any of clauses 1-7, wherein determining that a sufficient number of pending write transactions are available comprises determining that at least a first number of pending write transactions associated with a first group of memory banks are scheduled for execution during the second period of time and at least a second number of pending write transactions associated with a second group of memory banks are scheduled for execution during the second period of time.

9. The computer-implemented method of any of clauses 1-8, wherein preventing the first ECC write transaction from being scheduled for execution during the first period of time prevents the formation of a bubble on a command/data bus on which the first ECC transaction would have been scheduled for execution during the first period of time.

10. The computer-implemented method of any of clauses 1-9, wherein preventing the first write transaction from being scheduled for execution during the first period of time increases utilization of a command/data bus across the first period of time and the second period of time.

11. Some embodiments include a system, comprising a memory controller that schedules write transactions for execution by performing the steps of determining that an insufficient number of pending write transactions are available to mask one or more latencies associated with a first error-correcting code (ECC) write transaction during a first period of time when write transactions are scheduled for execution, in response to determining that an insufficient number of pending write transactions are available, preventing the first ECC write transaction from being scheduled for execution during the first period of time, determining that a sufficient number of pending write transactions are available to mask the one or more latencies during a second period of time when write transactions are scheduled for execution, and in response to determining that a sufficient number of pending write transactions are available, scheduling the first ECC write transaction for execution during the second period of time.

12. The system of clause 11, wherein the memory controller prevents the first ECC write transaction from being scheduled to execute by caching the first ECC write transaction during the first period of time and during a subsequent period of time when read transactions are scheduled to execute.

13. The system of any of clauses 11-12, wherein the memory controller performs the additional steps of determining that a first read transaction targets a memory page associated with the first ECC write transaction, and servicing the first read transaction using a cached version of the first ECC write transaction.

14. The system of any of clauses 11-13, wherein the memory controller performs the additional steps of scheduling one or more write transactions to execute using a first bank associated with a command/data bus during the second period of time, wherein scheduling the first ECC write transaction for execution comprises scheduling the first ECC write transaction to execute using a second bank associated with the command/data bus during the second period of time.

15. The system of any of clauses 11-14, wherein the first ECC write transaction executes during N clock cycles that occur during the second period of time, and the one or more write transactions include at least N write transaction(s), wherein N comprises a positive integer value.

16. The system of any of clauses 11-15, wherein the first ECC write transaction is associated with write data that is written to a first memory page during the first period of time, and wherein the first ECC write transaction is executed during the second period of time to write ECC data associated with the write data to the first memory page.

17. The system of any of clauses 11-16, wherein the memory controller determines that a sufficient number of pending write transactions are available by determining that at least a first number of pending write transactions associated with a first group of memory banks are scheduled for execution during the second period of time and at least a second number of pending write transactions associated with a second group of memory banks are scheduled for execution during the second period of time.

18. The system of any of clauses 11-17, wherein the memory controller prevents the first ECC write transaction from being scheduled for execution during the first period of time to prevent the formation of a bubble on a command/data bus on which the first ECC transaction would have been scheduled for execution during the first period of time.

19. The system of any of clauses 11-18, wherein the memory controller prevents the first write transaction from being scheduled for execution during the first period of time to increase utilization of a command/data bus across the first period of time and the second period of time.

20. Some embodiments include a subsystem, comprising a cache that stores memory transactions, and a transaction arbiter that performs the steps of determining that an insufficient number of pending write transactions are available to mask one or more latencies associated with a first error-correcting code (ECC) write transaction during a first period of time when write transactions are scheduled for execution, in response to determining that an insufficient number of pending write transactions are available, storing the first ECC write transaction in the cache to prevent the first ECC write transaction from being scheduled for execution during the first period of time, determining that a sufficient number of pending write transactions are available to mask the one or more latencies during a second period of time when write transactions are scheduled for execution, and in response to determining that a sufficient number of pending write transactions are available, scheduling the first ECC write transaction for execution during the second period of time.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   determining that an insufficient number of pending write transactions are available for execution during a first period of time to mask one or more latencies associated with executing a first error-correcting code (ECC) write transaction during the first period of time, wherein the first period of time corresponds to when write transactions are scheduled for execution;
   in response to determining that an insufficient number of pending write transactions are available, preventing the first ECC write transaction from being scheduled for execution during the first period of time;
   determining that a sufficient number of pending write transactions are available to mask the one or more latencies during a second period of time when write transactions are scheduled for execution; and
   in response to determining that a sufficient number of pending write transactions are available, scheduling the first ECC write transaction for execution during the second period of time.

2. The computer-implemented method of claim 1, wherein preventing the first ECC write transaction from being scheduled to execute comprises caching the first ECC write transaction (i) during the first period of time, and (ii) during a subsequent period of time when read transactions are scheduled to execute.

3. The computer-implemented method of claim 1, further comprising:
   determining that a first read transaction targets a memory page associated with the first ECC write transaction; and
   servicing the first read transaction using a cached version of the first ECC write transaction.

4. The computer-implemented method of claim 1, further comprising scheduling one or more write transactions to execute using a first bank associated with a command/data bus during the second period of time, wherein scheduling the first ECC write transaction for execution comprises scheduling the first ECC write transaction to execute using a second bank associated with the command/data bus during the second period of time.

5. The computer-implemented method of claim 4, wherein:
   the first ECC write transaction executes during N clock cycles that occur during the second period of time,
   the one or more write transactions include at least N write transaction(s), and
   N comprises a positive integer value.

6. The computer-implemented method of claim 1, wherein the first ECC write transaction is associated with write data that is written to a first memory page during the first period of time.

7. The computer-implemented method of claim 6, wherein the first ECC write transaction is executed during the second period of time to write ECC data associated with the write data to the first memory page.

8. The computer-implemented method of claim 1, wherein determining that a sufficient number of pending write transactions are available comprises determining that:
   at least a first number of pending write transactions associated with a first group of memory banks are scheduled for execution during the second period of time; and
   at least a second number of pending write transactions associated with a second group of memory banks are scheduled for execution during the second period of time.

9. The computer-implemented method of claim 1, wherein preventing the first ECC write transaction from being scheduled for execution during the first period of time prevents a formation of a bubble on a command/data bus on which the first ECC transaction would have been scheduled for execution during the first period of time.

10. The computer-implemented method of claim 1, wherein preventing the first ECC write transaction from being scheduled for execution during the first period of time increases utilization of a command/data bus across the first period of time and the second period of time.

11. A system, comprising:
   a memory controller that schedules write transactions for execution by performing the steps of:

determining that an insufficient number of pending write transactions are available for execution during a first period of time to mask one or more latencies associated with executing a first error-correcting code (ECC) write transaction during the first period of time, wherein the first period of time corresponds to when write transactions are scheduled for execution;

in response to determining that an insufficient number of pending write transactions are available, preventing the first ECC write transaction from being scheduled for execution during the first period of time;

determining that a sufficient number of pending write transactions are available to mask the one or more latencies during a second period of time when write transactions are scheduled for execution; and in response to determining that a sufficient number of pending write transactions are available, scheduling the first ECC write transaction for execution during the second period of time.

12. The system of claim 11, wherein the memory controller prevents the first ECC write transaction from being scheduled to execute by caching the first ECC write transaction (i) during the first period of time, and (ii) during a subsequent period of time when read transactions are scheduled to execute.

13. The system of claim 11, wherein the memory controller further performs the steps of:
determining that a first read transaction targets a memory page associated with the first ECC write transaction; and
servicing the first read transaction using a cached version of the first ECC write transaction.

14. The system of claim 11, wherein the memory controller further performs the step of:
scheduling one or more write transactions to execute using a first bank associated with a command/data bus during the second period of time,
wherein scheduling the first ECC write transaction for execution comprises scheduling the first ECC write transaction to execute using a second bank associated with the command/data bus during the second period of time.

15. The system of claim 14, wherein:
the first ECC write transaction executes during N clock cycles that occur during the second period of time,
the one or more write transactions include at least N write transaction(s), and
N comprises a positive integer value.

16. The system of claim 14, wherein:
the first ECC write transaction is associated with write data that is written to a first memory page during the first period of time, and
the first ECC write transaction is executed during the second period of time to write ECC data associated with the write data to the first memory page.

17. The system of claim 14, wherein the memory controller determines that a sufficient number of pending write transactions are available by determining that:
at least a first number of pending write transactions associated with a first group of memory banks are scheduled for execution during the second period of time; and
at least a second number of pending write transactions associated with a second group of memory banks are scheduled for execution during the second period of time.

18. The system of claim 11, wherein the memory controller prevents the first ECC write transaction from being scheduled for execution during the first period of time to prevent a formation of a bubble on a command/data bus on which the first ECC transaction would have been scheduled for execution during the first period of time.

19. The system of claim 11, wherein the memory controller prevents the first ECC write transaction from being scheduled for execution during the first period of time to increase utilization of a command/data bus across the first period of time and the second period of time.

20. A subsystem, comprising:
a cache that stores memory transactions; and
a transaction arbiter that performs the steps of:
determining that an insufficient number of pending write transactions are available for execution during a first period of time to mask one or more latencies associated with executing a first error-correcting code (ECC) write transaction during the first period of time, wherein the first period of time corresponds to when write transactions are scheduled for execution,
in response to determining that an insufficient number of pending write transactions are available, storing the first ECC write transaction in the cache to prevent the first ECC write transaction from being scheduled for execution during the first period of time,
determining that a sufficient number of pending write transactions are available to mask the one or more latencies during a second period of time when write transactions are scheduled for execution, and
in response to determining that a sufficient number of pending write transactions are available, scheduling the first ECC write transaction for execution during the second period of time.

* * * * *